United States Patent [19]
Morgan et al.

[11] Patent Number: 5,385,375
[45] Date of Patent: * Jan. 31, 1995

[54] REINFORCED IMPACT BEAM FOR A BUMPER ASSEMBLY AND METHOD OF MANUFACTURE

[75] Inventors: Terry B. Morgan, Lansing, Mich.; Dean M. Bayer, Anderson, Ind.

[73] Assignee: General Motors Corporation, Detroit, Mich.

[*] Notice: The portion of the term of this patent subsequent to Jun. 15, 2010 has been disclaimed.

[21] Appl. No.: 143,732

[22] Filed: Nov. 1, 1993

Related U.S. Application Data
[63] Continuation of Ser. No. 979,981, Nov. 23, 1992.

[51] Int. Cl.⁶ .............................................. B60R 19/22
[52] U.S. Cl. ....................................... 293/109; 293/122
[58] Field of Search ............... 293/109, 142, 120, 121, 293/122; 296/146.6

[56] References Cited

U.S. PATENT DOCUMENTS

| | | |
|---|---|---|
| 4,061,385 | 12/1977 | Schwartzberg . |
| 4,116,893 | 9/1978 | Flanagan . |
| 4,509,782 | 4/1985 | Manning . |
| 4,830,416 | 5/1989 | Matsuoka . |
| 4,978,562 | 12/1990 | Wycech . |
| 4,998,761 | 3/1991 | Bayer et al. . |
| 5,078,439 | 1/1992 | Terada et al. . |
| 5,080,410 | 1/1992 | Stewart et al. . |
| 5,092,512 | 3/1992 | Sturrus et al. . |
| 5,104,026 | 4/1992 | Sturrus et al. . |
| 5,139,297 | 8/1992 | Carpenter et al. . |
| 5,219,197 | 6/1993 | Rich et al. ............... 293/120 |

FOREIGN PATENT DOCUMENTS

| | | |
|---|---|---|
| 118548 | 7/1984 | Japan . |
| 94453 | 4/1987 | Japan . |
| 2081653 | 2/1982 | United Kingdom . |

OTHER PUBLICATIONS

*Bumper Design, Materials, and Fabrication*, R. R. Golze and R. F. Kienle, Society of Automotive Engineers, International Automotive Engineering Congress, Jan. 8–12, 1973.

*Primary Examiner*—David M. Mitchell
*Assistant Examiner*—Gary C. Hoge
*Attorney, Agent, or Firm*—Saul Schwartz

[57] ABSTRACT

An impact beam includes front, rear, top and bottom side walls connected to form a closed cross section. A foam gusset is formed in place and secured inside the impact beam, preferably along the midpoint of the impact beam. The gusset spans the distance between the front and rear walls, as well as the distance between the side walls to provide increased resistance to deformation.

5 Claims, 1 Drawing Sheet

REINFORCED IMPACT BEAM FOR A BUMPER ASSEMBLY AND METHOD OF MANUFACTURE

This is a continuation of application Ser. No. 07/979,981 filed Nov. 23, 1992, pending.

BACKGROUND OF THE INVENTION

1. Field of the Invention

The present invention relates generally to automotive bumpers, and in particular is concerned with a reinforced impact beam for a soft bumper assembly.

2. Description of the Related Art

Soft bumper systems for both front and rear ends of automobiles are well known. Generally, an impact beam or bar is mounted to the frame or support structure with brackets and fasteners or other suitable means. Impact beams are designed to resist deformation during impact, and reduce damage to the body and other components. Oftentimes, an energy-absorbing medium, e.g., compressible foam or collapsible cellular units, is mounted on an outer face of an impact beam to absorb energy imparted by a collision. A fascia, formed from a pliable material, is fitted over the energy-absorbing medium to provide an attractive outer cover for the bumper system.

Various profiles and cross sections are used for impact beams. Some cross sections are open due to a C-shaped beam, while others are closed via a box-shaped beam. The walls of impact beams are designed with as thin gauge materials as possible to reduce weight while still providing effective deformation resistance. In open cross-section beams, separately-formed reinforcing elements can easily be inserted and secured to provide increased resistance to the deformation of front walls of impact beams.

An example of a soft bumper system can be found in U.S. Pat. No. 4,998,761, issued to the present assignee. A C-shaped impact bar or beam is reinforced against deformation during impacts by an outwardly projecting rib and an add-on reinforcement member, preferably formed from aluminum or an alloy. While this combination has been found suitable, the use of the add-on reinforcement member increases the mass of the bumper assembly.

The art continues to seek improvements. It is desirable to provide a deformation-resistant impact beam having the least mass possible to reduce the cost of the impact beam and to enhance fuel efficiency of a vehicle. Furthermore, it is desirable to provide an economical means to reinforce an impact beam, particularly a closed cross section impact beam.

SUMMARY OF THE INVENTION

The present invention includes a reinforced impact beam for an automotive soft bumper system. The impact beam includes an interior reinforcing gusset formed from a lightweight material. The gusset material can be supplied in a liquid form and directed via a nozzle to the desired location. The liquid solidifies and fills a portion of the interior of the impact beam. Such material can easily and economically be adapted for closed cross-section impact beams. The reinforcing gusset permits a designer to use a reduced gauge material for the impact beam than would otherwise be possible.

In a preferred embodiment, an impact beam includes front, rear, top and bottom side walls connected to form a closed cross section. A foam gusset is formed in place and secured inside the impact beam, preferably along the midpoint of the impact beam. The gusset spans the distance between the front and rear walls, as well as the distance between the side walls to provide increased resistance to deformation.

DETAILED DESCRIPTION OF THE PREFERRED EMBODIMENT

Figure 1:
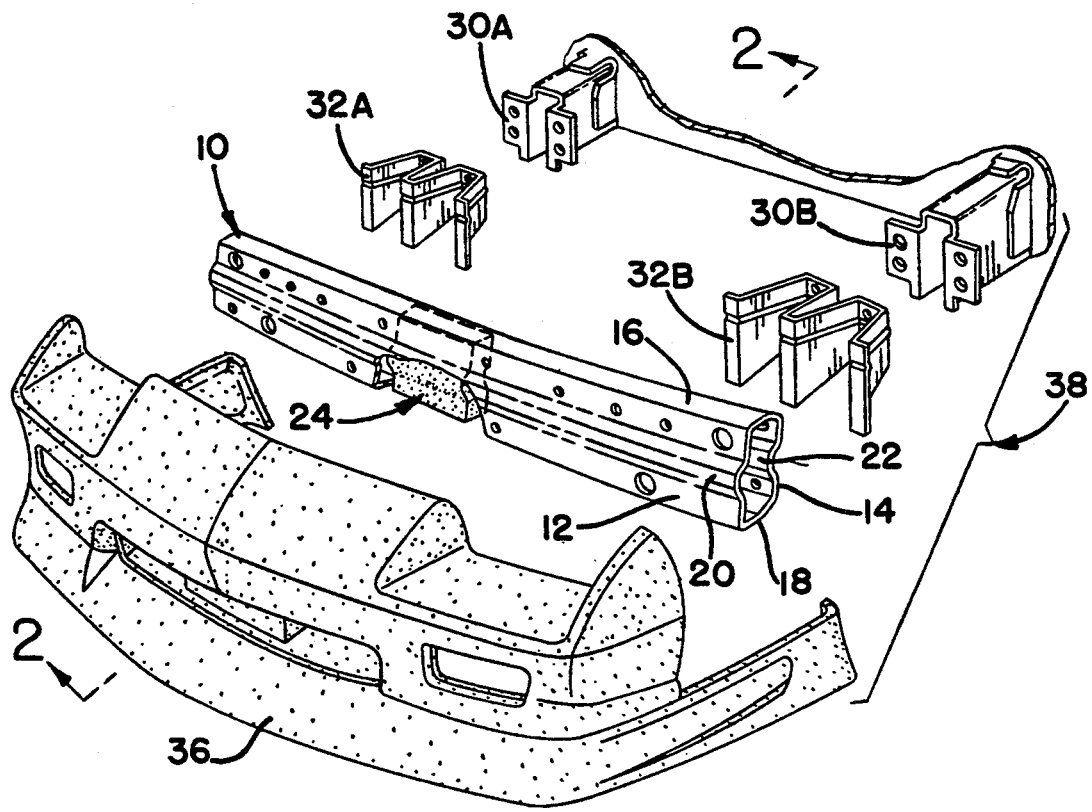
FIG. 1 is an exploded perspective view of an automotive soft bumper assembly including a preferred embodiment of the present impact beam, wherein a portion of the impact beam has been removed to illustrate a reinforcing foam gusset provided inside the impact beam at its midpoint.

An impact beam indicated generally at 10 is illustrated in FIG. 1. The impact beam 10 is an elongated member which spans the width of a vehicle and can be mounted to chassis support at either the front or rear of the vehicle. While the impact beam 10 is illustrated as a substantially straight tubular member, curved configurations are within the scope of this invention. Preferably, the impact beam 10 terminates in right and left open ends.

Figure 2:
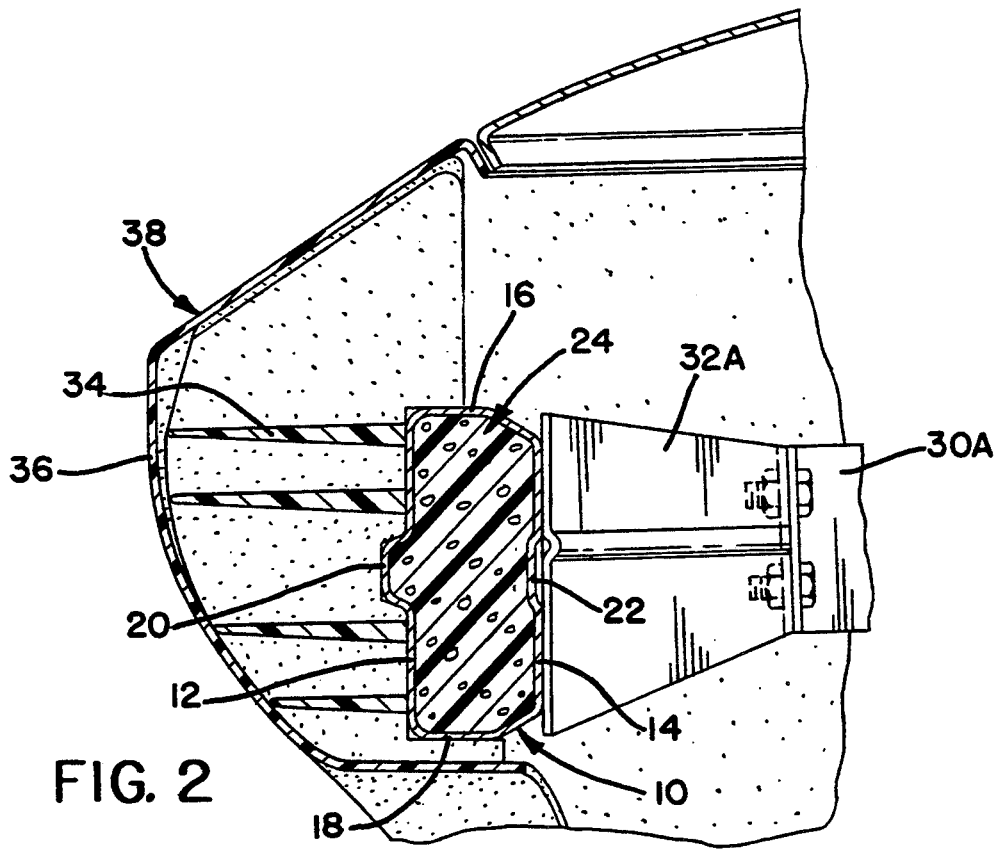
FIG. 2 is a sectional view taken along line 2—2 of FIG. 1 through the assembled bumper assembly illustrating the reinforcing foam gusset completely filling the interior of the impact beam.

The impact beam 10 includes substantially vertical front and rear walls 12, 14 connected by substantially horizontal top and bottom walls 16, 18 to form a closed cross section illustrated best in FIG. 2. The impact beam 10 is preferably formed from a lightweight material, such as aluminum or an alloy, capable of resisting deformation. The impact beam 10 can be formed by any suitable means, including roll-forming sheet metal.

The front wall 12 includes an outwardly projecting strengthening rib 20. Preferably, the rib 20 spans the length of the impact beam 10 and is integrally formed in a central portion of the front wall 12. While the rib 20 is illustrated with a rounded or somewhat semicircular cross section, other shapes can also be used. A strengthening rib 22 can be provided at a central portion of the rear wall 14.

A reinforcing foam gusset 24 is provided inside the impact beam 10. Preferably, the gusset 24 is located at the midpoint of the impact beam 10 and spans a preselected portion of the total length of the impact beam 10. For example, a gusset having a length of 100 mm centered at the midpoint of an impact beam having a total length of approximately 1100 mm has been found satisfactory. In other embodiments, a foam gusset(s) can be selectively located inside the impact beam 10. Preferably, the gusset 24 completely fills the interior of the impact beam 10 without voids and engages all walls 12, 14, 16 and 18. The gusset 24 is formed from a lightweight material which reinforces the front wall 12 and transmits impact loads to the rear wall 14.

Urethane has been found to be a suitable material for the gusset 24. In a preferred construction, liquid urethane is delivered into an open end of the impact beam 10 via a nozzle and permitted to solidify. As the urethane solidifies, adhesion to inner surfaces of the walls 12, 14, 16 and 18 occurs, thereby securing the position of the gusset 24 without conventional fasteners or adhesives. Preferably, the portions of the walls 12, 14, 16 and 18 adjacent the gusset 24 do not include openings.

As illustrated in FIGS. 1 and 2, the impact beam 10 can be installed on vehicular side rails and 30B with respective mounting brackets 32A and 32B. An energy absorber 34 is mounted on the front wall 12 and then covered by a fascia 36 to complete a soft bumper assembly 38.

During an impact to the bumper assembly deformation initially occurs at the fascia 36 and the energy absorber 34. When an impact load reaches the impact beam 10, the rib 20 enhances the deformation resistance of the front wall 12. The gusset 24 further reinforces the front wall 12 and transmits impact loads to the rear wall 14 which is rigidly supported against the side rails 30A and 30B via the brackets 32A and 32B. The gusset 24 increases the deformation resistance of the impact beam 10 in an economical manner without adding substantial mass to the bumper assembly 38.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A reinforced bumper assembly mounted at the front or rear end of an automobile comprising:
    (a) a unitary impact beam having a closed cross section formed by laterally spaced front and rear walls connected by top and bottom walls and at least one open end;
    (b) rib means formed in at least one of the front and rear walls;
    (c) a foam gusset spanning the distance between and bonded to at least the front and rear walls;
    (d) energy absorber means mounted on the front wall of the impact beam; and
    (e) a fascia covering the energy absorber means.

2. The reinforced bumper assembly of claim 1 wherein the foam gusset is formed from urethane.

3. The reinforced bumper assembly of claim 1 wherein the rib means is an outwardly projecting strengthening rib integrally formed in the front wall of the impact beam.

4. The reinforced bumper assembly of claim 1 wherein the foam gusset is centered about the midpoint of the impact beam and bonded to each of the front and the rear walls and the top and the bottom walls.

5. The reinforced bumper assembly of claim 1 wherein the impact beam is a unitary roll-formed member.

* * * * *